Aug. 11, 1970 MITSURU MIZUHO 3,524,061
GILES' GAS RECOIL NEUTRON SPECTROMETER
Filed Sept. 18, 1967 3 Sheets-Sheet 1

INVENTOR.
MITSURU MIZUHO
BY Kurt Kelman

Aug. 11, 1970 MITSURU MIZUHO 3,524,061
GILES' GAS RECOIL NEUTRON SPECTROMETER
Filed Sept. 18, 1967 3 Sheets-Sheet 3

INVENTOR.
MITSURU MIZUHO
BY Kurt Kelman
AGENT

United States Patent Office

3,524,061
Patented Aug. 11, 1970

---

3,524,061
GILES' GAS RECOIL NEUTRON SPECTROMETER
Mitsuru Mizuho, Ibaraki-ken, Japan, assignor to Japan Atomic Energy Research Institute, Tokyo, Japan
Continuation-in-part of application Ser. No. 366,748, May 12, 1964. This application Sept. 18, 1967, Ser. No. 668,559
Claims priority, application Japan, May 21, 1963, 38/25,422
Int. Cl. G01t 3/00
U.S. Cl. 250—83.1                              1 Claim

ABSTRACT OF THE DISCLOSURE

A Giles' gas recoil neutron spectrometer with a main detector and a series of axial directed subsidiary detectors which provide a coincidence signal to the main detector thereby eliminating the effects of wide angle recoils.

---

This application is a continuation-in-part of the U.S. patent application Ser. No. 366,748, filed on May 12, 1964, now abandoned, by Mitsuru Mizuho.

This invention relates to a Giles' gas recoil neutron spectrometer and in particular presents improvements thereto such as to increase its efficiency by eliminating the effect of wide angle recoils.

Many instruments are currently in use for the measurement of neutron energy spectra. A most advanced technique in this area has been the Giles' gas recoil neutron spectrometer which was constructed, implemented and described by R. E. Benenson et al., in the article, "Gas-Recoil Fast Neutron Spectrometer" from The Review of Scientific Instruments, vol. 29, No. 1, January 1958, pp. 1–9. One of the problems described as an inherently unavoidable feature of the system is the spectrum of the large-angle recoils. In order to reduce the effect of these recoils, it is possible to increase the separation of the cutoff of the large-angle recoils and the peak energy; however, this reduction comes at the cost of spectrometer efficiency.

This invention proposes a method whereby the large angle recoils will have no effect on the output and its elimination will not in any way impair the efficiency of the system.

The present invention provides a neutron spectrometer having two end neutron detectors and a main neutron detector disposed between the two end detectors, in which the main neutron detector comprises a succession of three or more detector sections each of which is responsive to one and the same kind of radiation. The said main radiation detector particularly comprises a conducting cylindrical part and a gaseous atmosphere within the cylindrical part through which a plurality of conductors extend in a longitudinal direction. The three or more sections of the main detector being formed by means of insulating interruptions spaced along one or more of said conductors, whereby electrical potentials may be separately applied to the portions of said one or more conductors which lie between insulating interruptions, and to the conducting cylindrical part.

The circuitry associated with this spectrometer is so arranged that the main neuton detector will only provide an output when the recoil angle is within specified bounds such that the total track is within the main detector. By so arranging the output circuitry, these recoils which are larger than the bounds and either pass into the side detectors or do not continue through all sections of the main detectors will automatically prevent any output.

The concept of using a series of detectors connected in coincidence has been used in various instruments. Scherbatskoy "Radiation Detector," U.S. Pat. No. 2,990,474, and "Dip Determination," U.S. Pat. No. 2,967,933, describe a gamma radiation detector which detects only axial rays producing a Compton effect in a series of crystals connected in coincidence. The system as described is not suitable for a gas recoil spectrometer since the neutrons are always fired axially to the spectrometer. Furthermore, in the gas recoil spectrometer, because of electric potentials applied to the portions of the conductors and because of the anticoincidence circuitry required, it is necessary to have the output coming from the main detector and not an accumulation from the subsidiary detectors.

It is therefore an object of the invention to provide a method of operation in a gas-recoil spectrometer employing coincidence circuitry wherein the output is still derived from the main detector.

A general object of the present invention is to provide an improved neutron spectrometer which is characterized by its simplicity and accuracy in comparison with previously known radiation spectrometers.

A specific object of the invention is to provide an improved neutron spectrometer in which the neutron does not generate an output if the recoil angle of the recoil proton is too large.

These and other features, objects and advantages of the invention will, in part, be pointed out with particularity and will, in part, become obvious from the following more detailed description of the invention, taken in conjunction with the accompanying drawing which forms an integral part thereof.

In the various figures of the drawing like reference characters designate like parts.

Figure 5A:
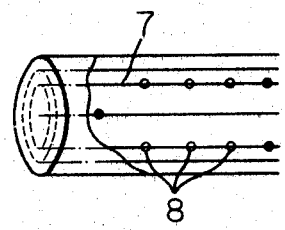
Figure 5B:
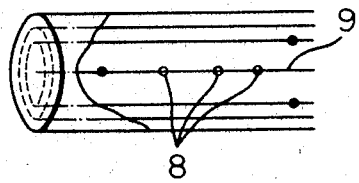
Figure 6:
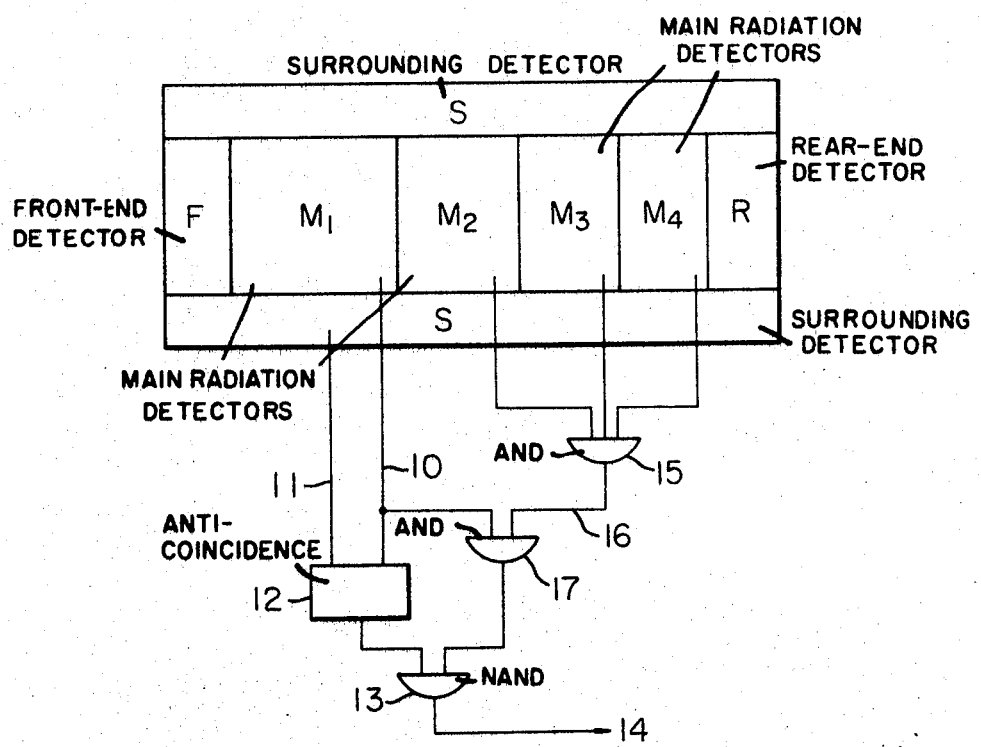

FIG. 5a and FIG. 5b explain the construction of embodiments of the neutron spectrometer provided in accordance with the invention; and FIG. 6 shows the geometrical arrangement of the detectors consisting of the neutron spectrometer shown in FIG. 5a and FIG. 5b, together with a block diagram of the coincidence and anti-coincidence circuitry.

Generally, the principle of a gas recoil neutron spectrometer is explained as follows: The neutrons incident in the gas collide with hydrogen atoms in the gas and the so-called proton recoil phenomenon is brought about. The relation between the energy of the incident neutron and the energy given to the recoil proton is given by the following equation:

$$E_p = E_n \cos^2 \theta \quad (1)$$

where $E_p$ is the energy given to recoil proton
$E_n$ is the energy of the incident neutron, and
$\theta$ is the recoil angle.

Therefore, when the energy of recoil protons having a predetermined recoil angle is measured, the energy of the incident neutron is clearly shown by the following equation:

$$E_n = K E_p \quad (2)$$

where K is a constant.

R. E. Benenson et al. disclosed a neutron spectrometer which is provided in accordance with the principle shown by Giles.

Figure 1:
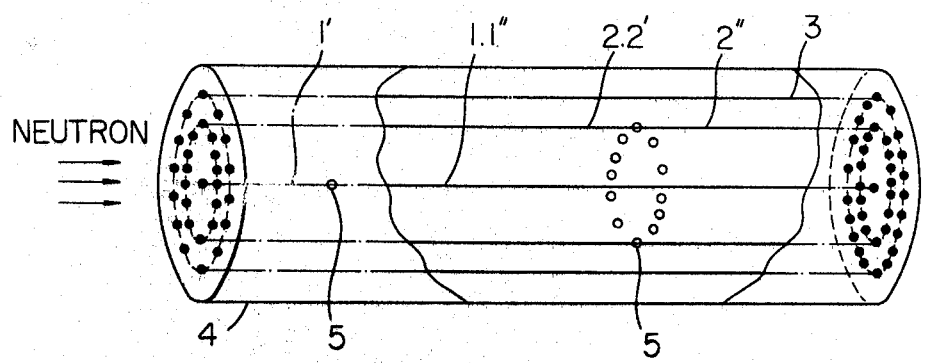
FIG. 1 shows a skeleton diagram of a Giles' type neutron spectrometer known in prior art.

The construction of the neutron spectrometer developed by Benenson et al., is shown in FIG. 1, in which $n$ wires 2, $2n$ wires 3 and a metallic cylinder 4 are arranged circumferentially and concentrically around a center wire 1. A plurality of beads 5 of insulating material, such as glass, divide wire 1 and wires 2 into two groups 1' and 1.1'', and 2.2'' and 2'', respectively.

Figure 2:
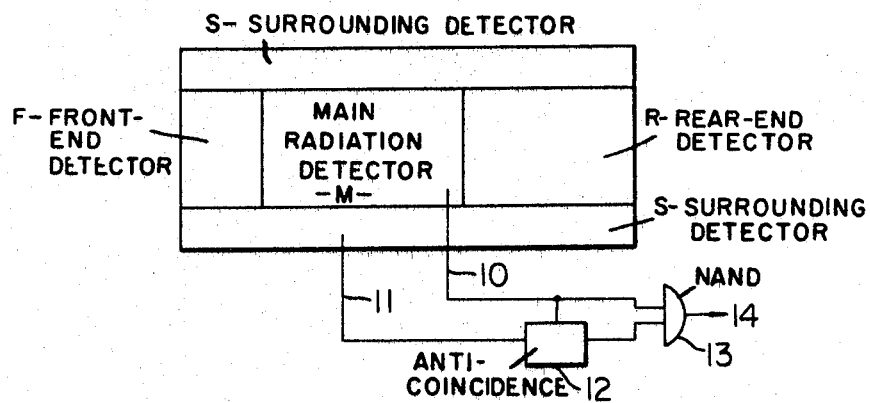
FIG. 2 shows the geometrical arrangement of the detectors consisting of the neutron spectrometer shown in FIG. 1, together with a block diagram of the anti-coincidence circuitry.

The construction shown in FIG. 1 requires a gas filling, said gas being such as butane, propane or hydrogen gas. Metallic cylinder 4 may act as an enclosure for the gas. If a number of appropriate potential differences are applied to between wire 1, wires 2, wires 3 and cylinder 4, a plurality of nuclear radiation detectors, such as ionization chamber, proportional counter and Geiger-Muller counter can be obtained. The geometrical arrangement of the detectors is shown in FIG. 2, in which the main detector M, the front-end detector F, the rear end detector R are encircled by the surrounding detectors S.

The output 10 from the main detector M and the output 11 from the side detectors S are fed to an anticoincidence circuit 12. This circuit can be of any type known including any electronic circuit. The output from the circuit 12 together with the main detector output 10 are introduced into another circuit 13. For convenience of explanation, circuit 13 will be described as a logical NAND whereby system output 14 will only appear when main detector has an output but side detectors do not have any outputs.

Figure 3A:
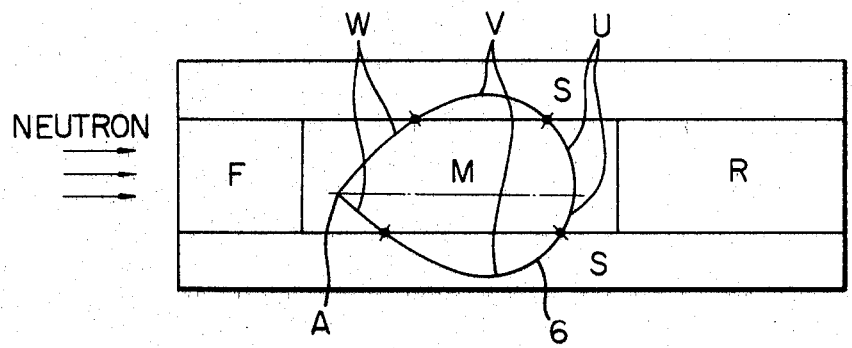
FIG. 3A shows the locus of the ends of the tracks of the recoil protons occurring in the detector shown in FIG. 1.

As shown in FIG. 3, assume that the beamed neutrons incident in a spectrometer having monochromatic energy result in recoil protons at a point A within the main detector M. A curve 6 is the locus of the track ends of the recoil protons when the recoil angle varies over the whole range obtainable. Curve 6 is divided into 3 portions, U, V and W. These 3 portions correspond to the following recoil conditions respectively:

U: The recoil angle is so small that the total track is within the main detector M.
V: The recoil angle is medium and the ends of the tracks reach the surrounding detectors S.
W: The recoil angle is so large that the total track is within the main detector M.

The output of the recoil protons corresponding to V is cancelled by use of anticoincident technique, as hereinbefore explained, between the outputs from the main detector M and the surrounding detectors S.

Figure 3B:
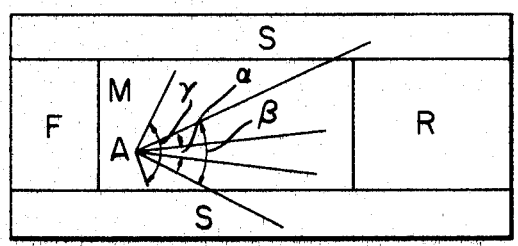
FIG. 3B shows the angles of the various recoil protons.

Referring to FIG. 3B the angle limits of the recoil protons are shown from a point A in the main detector M. Protons with recoil angles corresponding to $\alpha$ are totally within the main detector but their wide angles hamper the output measurement of the system. Protons having recoil angles of approximately $\beta$ pass from the main detector into the side detectors. The protons with recoil angles $\alpha$ are those which are the proper measurement of neutron energy.

Figure 4:
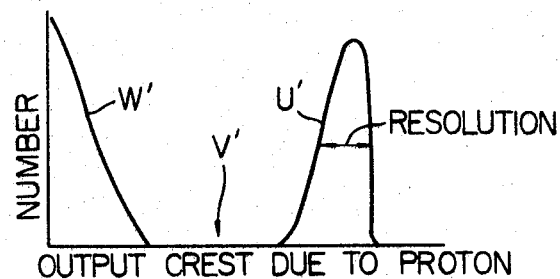
FIG. 4 is a diagram showing the output spectrum of the spectrometer shown in FIG. 1.

The final output spectrum of the spectrometer is shown in FIG. 4.

In FIG. 4, U', V' and W' are the outputs of the recoil protons U, V and W, respectively.

The desired spectrum is U'.

U' shows the energy of recoil protons of selected recoil angle. Incident neutron energy can be easily derived from this proton energy. The Full Width at Half Maximum of the U' (and then resolving power of the spectrometer) is determined by the ratio of the range of the recoil protons (at recoil angle $\theta = 0$ in this case) to the diameter of the main detector M. The front-end detector F and the rear-end detector R are provided to eliminate the distortion of the output spectrum caused by the end wall effect. One of the defects of the Benenson's spectrometer is the existence of the output W'.

Output W' is objectionable as follows:

Consider a case where the incident neutrons consist of two groups such as a high energy group and a low energy group, and the output U' generated by the low energy group overlaps the output W' generated by the high energy group. Distinguishing these two outputs is considerably complicated and apt to be erroneous. This fault becomes even more serious when the neutrons having a continuous energy spectrum are to be measured.

The present invention relates to the elimination of this defect. In FIG. 5a, a plurality of wires 7 correspond to wires 2 in FIG. 1, and in FIG. 5b, wire 9 corresponds to wire 1 in FIG. 1. In FIGS. 5a and 5b, insulating material 8 such as insulating material 5 in FIG. 1 are inserted between segments of wires 7 and 9. So, the main detector M is divided into four detectors $M_1$, $M_2$, $M_3$, and $M_4$, as shown in FIG. 6 by insulating material 8.

In order to simplify discussion, the outputs from the detection will be explained using logic blocks. However, it will be understood that any type of electronic circuitry can be used to accomplish the same results. As shown in FIG. 6, outputs from detectors $M_2$, $M_3$, $M_4$ are joined together in "AND" block 15. This serves as a coincidence detector and provides an output only when the three detectors react simultaneously. The coincidence of detectors $M_2$, $M_3$ and $M_4$ then provide an output 16 which is taken together with output 10 from M, and joined in "AND" block 17. Accordingly, the output from the main detector $M_1$ will only be measured when outputs exist from detectors $M_2$, $M_3$, and $M_4$. The anticoincidence circuitry between main detector $M_1$ and side detectors S as described in connection with FIG. 2 is included in this circuit as well.

Using the coincidence or anticoincidence technique between outputs from the four detectors, an output is taken out from the main detector $M_1$ only when the three neighboring detectors offer outputs simultaneously. By the arrangement stated above, the recoil protons corresponding to U, shown in FIG. 3, can generate outputs from the three neighboring detectors simultaneously, and then U' remains as the output of the spectrometer while the recoil protons corresponding to W shown in FIG. 1 cannot generate a simultaneous output from the three neighboring detectors since the track range of the recoil proton corresponding to W is short. Therefore, the arrangement of this invention can eliminate the undesirable output W' of the conventional Benenson spectrometer.

The collimating process utilizing the principle stated above can be applied to the detectors for the radiation other than the neutron, said detectors being, for example, the scintillation counter, the proportional counter, or the Geiger-Muller counter.

While a preferred embodiment of the present invention is disclosed, it is recognized that the scope of the present invention is not limited thereto and it is therefore intended that the scope of the present invention be defined by the scope of the appended claim.

What I claim as new and desire to secure by Letters Patent is:

1. A gas-filled recoil neutron spectrometer of the Giles type comprising an outer enclosure, a main detector containing a recoil proton proportional counter and situated in the interior of said enclosure, side detectors situated around said main detectors, a plurality of subsidiary detectors arranged in a row longitudinally with said enclosure and being axial with the direction of the incoming neutrons, an anticoincidence counter connected integrally with said main detector and said side detectors wherein a recoil proton trace extending angularly from said main detector through said side detectors in excluded from being measured, and a coincidence counter connected integrally between said plurality of subsidiary detectors and said main detector wherein said main detector produces an output only when said subsidiary detectors produce outputs simultaneously, whereby recoil protons within a predetermined angle are counted.

References Cited

UNITED STATES PATENTS

| | | | |
|---|---|---|---|
| 2,967,933 | 1/1961 | Scherbatskoy | 250—71.5 |
| 2,990,474 | 6/1961 | Scherbatskoy | 250—71.5 |
| 3,233,103 | 2/1966 | Aoki | 250—83.1 |

ARCHIE R. BORCHELT, Primary Examiner

U.S. Cl. X.R.

250—71.5